E. TALBOT.
FISHING FLOAT.
APPLICATION FILED OCT. 29, 1919.

1,350,530.

Patented Aug. 24, 1920.
2 SHEETS—SHEET 1.

Inventor
Ernest Talbot
By Spear, Middleton, Donaldson & Hall
Attys

Inventor
Ernest Talbot

UNITED STATES PATENT OFFICE.

ERNEST TALBOT, OF LOWESTOFT, ENGLAND.

FISHING-FLOAT.

1,350,530.  Specification of Letters Patent.  Patented Aug. 24, 1920.

Application filed October 29, 1919. Serial No. 334,118.

*To all whom it may concern:*

Be it known that I, ERNEST TALBOT, a subject of the King of England, residing at Lowestoft, in the county of Suffolk, England, have invented certain new and useful Improvements in Fishing-Floats, of which the following is a specification.

This invention relates to fishing floats and has for its principal object to provide an exceedingly light and buoyant construction so that its dimensions may be kept as small as possible.

The manner of carrying out this invention is set forth in the accompanying drawings, in which, Figures 1 and 2 are perspective views showing stages in one method of manufacture of a two-part float.

Like letters indicate like parts throughout the drawings.

Figure 1:
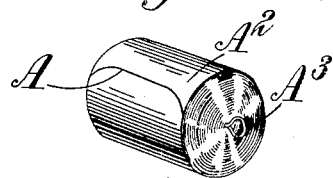
Figure 2:
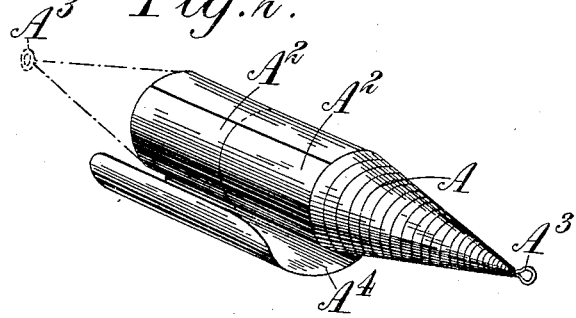
Figure 3:
Fig. 3 is a side elevation of the float when finished, drawn to a smaller scale than the previous figures.

In one construction, material such as paper in the form of a strip A is wound spirally to form a coil $A^2$ upon an eyeleted rod $A^3$, which may be of wire bent upon itself, with the eye in the bend, which is arranged to protrude from the end of the coil A when wound. The inner end of the strip is cemented to the rod $A^3$ and the outer end is secured upon itself to prevent unwinding (see Fig. 1). Two such coils A are thus formed and put end to end with the eyes $A^3$ outward. They are then joined to one another by winding around them a strip $A^4$ of a width to embrace both. By means of the eyes $A^3$ at each end, the coils $A^2$ are then pulled endwise whereby their winding assumes a spiral helical form (see Fig. 2) and a hollow chamber of double conical shape is formed, as shown in Fig. 3. Obviously the angles of the cones may be varied at pleasure to produce a long or short float or a high or low degree of buoyancy. After appropriately coloring it the float may be waterproofed by any desired process, such as by coating it with a spirit varnish or with liquid celluloid. In so coating the float, the liquid employed creeps between the coils where they overlie one another and thus forms a cement which firmly unites the contiguous surfaces of the strip and prevents leakage into the float at their edges. The eyes $A^3$ form suitable means for hanging the float during painting and proofing, but may afterward be removed, or one only retained, at the lower end for the fishing line, and a rubber band or any other appropriate means provided to hold the line at the other end.

Obviously, if desired, the coloring medium may be incorporated with that employed for waterproofing.

Figure 5:
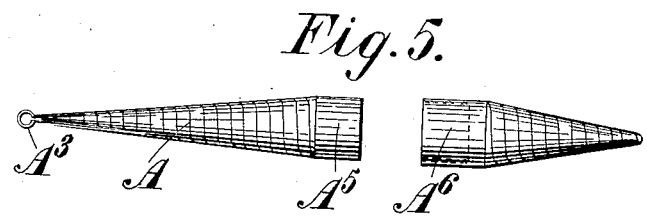
Fig. 5 shows a method of jointing two parts of a float which is alternative to that shown in Fig. 2.

In a modified construction the joining strip $A^4$ for joining the two coils $A^2$ may be dispensed with by making the one coil small enough at its large end $A^5$ to telescope into the large end $A^6$ of the other coil as shown in Fig. 5. When so telescoped the two coils are fixed by gum or the like, dyed and waterproofed.

Figure 4:
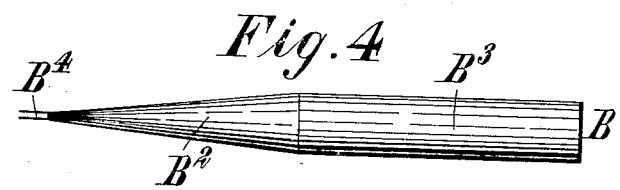
Fig. 4 is a side elevation of a "former" for use in an alternative method of construction.

An alternative method of constructing the float consists in winding the strip A upon a "former," and as before constructing the float in two parts and joining them at their big ends. Such a "former" B is shown in Fig. 4 and comprises a tapering part $B^2$ extending from a parallel sided part $B^3$ which can be held in a collet or a chuck of a winding machine. At the small end of the "former" B are prongs $B^4$, or any other convenient device by means of which the free end of the strip can be fixed previous to commencing the winding. The winding of the strip is terminated on the parallel sided part $B^3$ of the "former," and obviously by employing a range of "formers," floats may be constructed with any desired taper at each end and any desired length of parallel sided middle body. This last part may either be wound as a helix (see Fig. 7) or by employing strip whose width is sufficient for the length required in the parallel part of the float. The two parts constructed on the "formers" may be adapted to unite telescopically or be joined in the manner above described with reference to Fig. 2. Obviously the "formers" may be of any desired cross section to suit the type of float required.

It will be seen that by either method of forming the float, if desired the ends can be tapered, one long and the other short, so as to have the greatest diameter well above the middle of the float whereby the center of buoyancy can be kept correspondingly high.

If desired, to form the bead often required at the top of the float to aid visibility, the gum, dye or waterproofing composition, or all or any of these, may be laid on thickly or used in a specially viscous condition and allowed to drain to that end of the float, which can be suspended by the eye $A^3$ at the other end. The composition will collect at the end in the form of a ball $A^7$ (Figs. 6 and 7) which eventually hardens and serves to afford good visibility.

If desired, the float may be wound or finally shaped, so as to be of elliptic or other similar section in order by its streamline shape, to offer but little resistance to the current.

Figure 6:
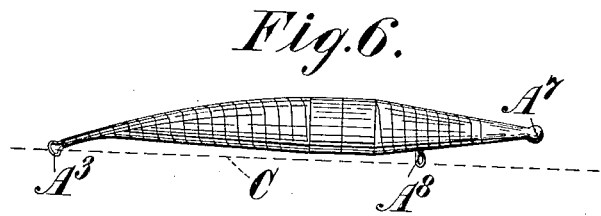
Fig. 6 shows a curved float of the "slider" type.

In the case of a "slider" float, the float would be bent slightly, as shown in Fig. 6, the lower part being either wound upon a bent former or shaped after winding. Thus the fishing line C shown in the dotted line stands clear of the float and may run through an eye $A^8$ fixed to the side of the upper part. This upper eye may be of wire "wound in" during winding the coil or fixed after manufacture, by making a hole in the side of the float and inserting the shank of the eye.

Figure 7:
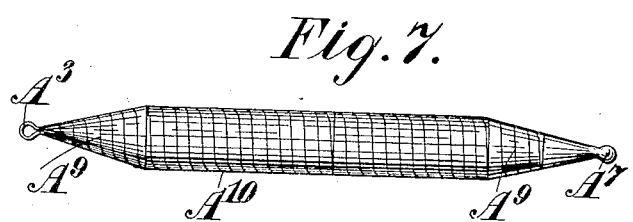
Fig. 7 shows a modified float in which a relatively large portion of the middle of the float is parallel-sided.

If desired, in some cases, the float may comprise short cones $A^9$ at the ends these being connected together by a parallel length $A^{10}$ as shown in Fig. 7, which, together with the cones would be wound, either to final shape upon a former, or flat and then pulled out in the manner described. Or such a float may be in two parts only, each part being wound partly parallel and partly conical, as above referred to.

It will be apparent that by this invention light and strong floats of any desired form, proportion, or cross section can readily be constructed in a simple and inexpensive manner and will possess considerable buoyancy in proportion to their size.

What I claim as my invention and desire to secure by Letters Patent is:—

1. A hollow fishing float constructed of strip material formed into a helix at each end which is coated with adhesive and waterproofing material, substantially as described.

2. A float according to claim 1 in which the tapering end-parts are each constituted by winding the strip spirally upon itself to form a coil and thereafter withdrawing the center portion in an axial direction from the outer circumference of the so-formed coil, eyelets being wound into the convolutions of the coil.

3. A float according to claim 1 comprising two tapering parts with substantially parallel-sided portions at their big ends, which are there adapted to be joined to one another, substantially as described.

4. A float according to claim 1 in which a bead is formed at the end of the float by coating it with a viscous fluid and causing the said fluid to drain to the required end of the float there to assume a globular form before hardening, substantially as described.

In testimony whereof I have signed my name to this specification in the presence of two subscribing witnesses.

ERNEST TALBOT.

Witnesses:
W. BYAN FORWARD,
J. W. FORDHAM.